March 11, 1924.

C. E. WALKER 1,486,705

DECORATIVE COATING AND METHOD OF FORMING THE SAME

Filed March 6, 1922

Charles E. Walker, INVENTOR.

BY
Geo. P. Kimmel
ATTORNEY.

Patented Mar. 11, 1924.

1,486,705

UNITED STATES PATENT OFFICE.

CHARLES E. WALKER, OF HAMILTON, OHIO.

DECORATIVE COATING AND METHOD OF FORMING THE SAME.

Application filed March 6, 1922. Serial No. 541,475.

*To all whom it may concern:*

Be it known that I, CHARLES E. WALKER, a citizen of the United States, residing at Hamilton, in the county of Butler and State of Ohio, have invented certain new and useful Improvements in Decorative Coatings and Methods of Forming the Same, of which the following is a specification.

This invention has reference to decorative coating and method of forming the same, whereby ornamental effects may be produced upon various articles whereby to greatly enhance their esthetic appearance.

In accordance with the invention, there is provided a basic or body member constituting an inner or supporting structure, which may be made of very cheap material and be capable of holding various articles.

The support or holder may be of cheap resisting material capable of receiving exteriorly a decorative coating, strongly adherent to the container article, and which article when finished is of a highly decorative appearance and markedly esthetic, beside being strongly resistant to forces tending to damage its surface.

The body of the container may be made of ordinary earthen-ware pottery, which because of its construction, is cheap to manufacture and represents but a small cost in the finished article. Nor is the basic member of the article confined to any particular type of manufacture, but may be made in a great variety of ways as the manufacturer may desire.

The invention contemplates the coating of the exterior of the container with a surface strongly adherent to the flower pot or other support employed, and this flower pot or the like is strongly resistant to distorting forces, so that the outer coating is at no time easily detached from the flower pot.

In preparing the coating composition for the basic support, whether it be in the form of a flower pot or in some other form to constitute a supporting body, a suitable quantity of old paper is cooked until it becomes converted into a pulp and then a desirable quantity of dye is added. There are numerous dyes upon the market known by different trade names and a familiar dye is known as a Diamond Dye of any suitable color or tint. Other dyes may be employed, but the particular kind is not at all material.

Having formed the pulp, constituting in effect papier mâché, with the pulp suitably dyed, the paper pulp is pressed out so as to discharge the water contained therein to an extent to make it almost dry, leaving only enough dampness in the pulp to mix properly with paste. This paste may be formed from flour and a sufficient quantity of flour is taken to produce a heavy paste, a small quantity of dye being added to the paste to color it, since the addition of the flour to make a heavy paste will tend to lighten the resultant color.

After mixing, the flour and dye with the paper pulp is cooked from fifteen to twenty-five minutes so as to take up as much water as the paste will absorb thereby producing a stiff or solid paste. Then the composition is allowed to cool, but not allowed to get hard or crusty.

Now to the quantities of the ingredients already named, there is added about a pint of water and then a small quantity or dye, and the resultant mixture is allowed to boil for about thirty minutes, after which enough warm water is added to make approximately a quart of the mixture, and enough dye is added to get the desired color or blend. Following this, there is added to the mixture enough glue, about one pound in quantity, to a quart of dye water, and the composition is cooked for about thirty minutes until it gets somewhat thick like syrup and this resultant composition is kept good and hot.

The paper pulp and the paste are mixed together while the ingredients are a little warm and then hot colored glue is mixed with the paper and paste to form a fatty body, in appearance something like clay, and the mixture is then allowed to cool off.

Following this, sufficient cement is taken to produce a body that is a little stiff.

I then take such articles as flower pots and the like, and provide a mould, usually of plaster of Paris to form pottery ware.

To produce an ornamental appearance on the outer coating of the pot to simulate bark, the papier mâché coating is cut with a knife, knots are embedded thereon and the surface is worked smooth.

Then remove the composite article from the mould and permit it to dry at a very low heat, say about twenty-five degrees. This is because the cement should not dry too fast, but allows the cement to absorb as much of the moisture as possible, the cement coming to the top or face of the article, leaving the pulp and paste next to the article but with enough cement to stiffen the article. Then the article, so far as finished, is baked in an oven to about forty to sixty degrees according to the thickness of the article.

The article is then dipped into glycerine and silica and stroked with a brush, after which the article is passed through an oven heated to about twenty degrees for a period of about ten minutes so that the article is made dry and is thus finished.

The invention will be best understood from a consideration of the following detailed description taken in connection with the accompanying drawings forming part of this specification with the understanding however that the invention is not confined to any strict conformity with the showing of the drawings, but may be changed and modified so long as such changes and modifications mark no material departure from the salient features of the invention as expressed in the appended claims.

In the drawings:—

Figure 1:
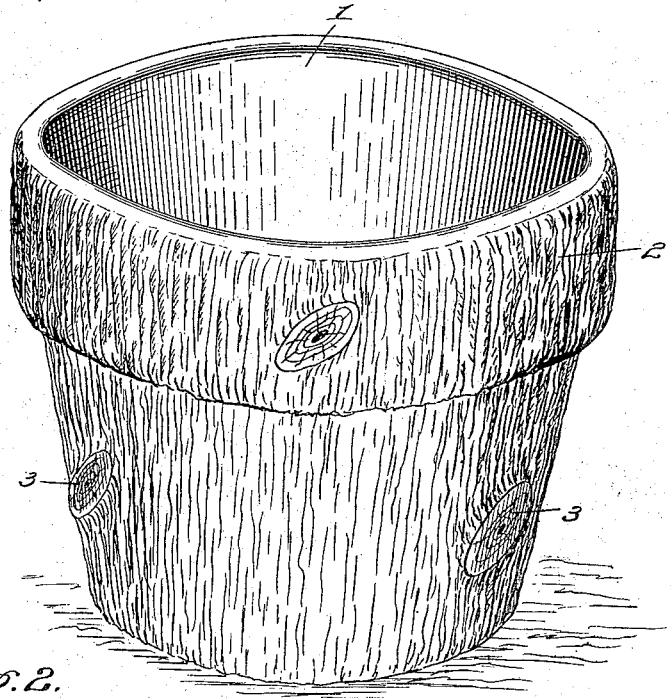
Figure 1 is a perspective view of an article produced in accordance with the invention, the particular form of article being that of a flower pot, but which may assume various other forms.
Figure 2:
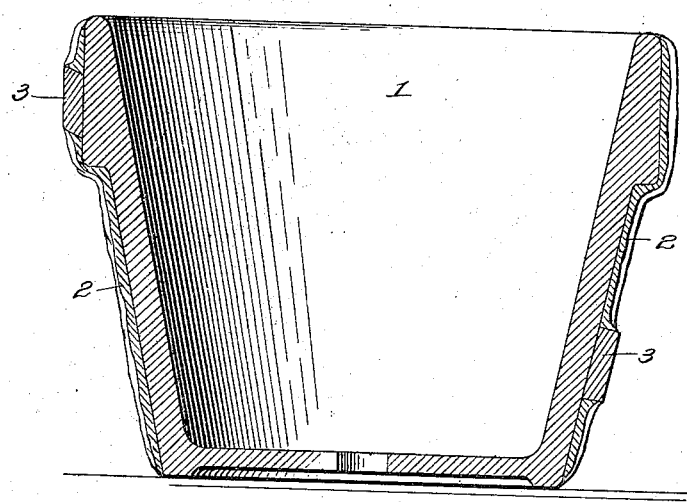
Fig. 2 is a vertical section of the structure of Fig. 1.

Referring to the drawings, there is shown a body member 1 which may be considered as that of a flower pot of ordinary construction and shape.

On the surface of the flower pot 1 is a covering 2 made up of a mixture of papier mâché constituting a body ingredient of the composition, a paste or adhesive formed of flour, another paste or adhesive in the form of glue, sufficient dye to produce the desired shade or color and a surface finish comprising cement.

Embedded at various points in the surface coating are wooden knots 3.

So far as the exterior coating applied to the flower pot or other article, it can only be approximately given since the composition varies somewhat in accordance with the color employed, but may be stated as consisting of about fifteen pounds of paper pulp to about five pounds of flour and about two pounds of glue, the composition being dyed to the proper shade and cement being employed to the extent of about two and one-half pounds. These ingredients however are susceptible of change to some extent, but may approximate the amounts given.

What is claimed is:

1. A method of decorating consisting in applying a stiff body of dyed paper pulp containing dyed cementitious substances to one face of the article to be decorated, then treating the coating to simulate bark, then adding knots to the coating, then drying the article, then subjecting the article to baking to the desired degree, then dipping the baked article into glycerine and silica, then stroking the article with a brush, and then heating the article for a predetermined period.

2. In a method of decorating, a coating formed from a body of dyed paper pulp having the excess water expelled therefrom, then adding a dyed adhesive material to said body of pulp, then heating the mixture to thicken the same, then bringing the mixture to a clay like consistency by the addition of dyed liquid glue thereto, and then stiffening the mixture by the addition of a cementitious substance.

In testimony whereof, I affix my signature hereto.

CHARLES E. WALKER.